United States Patent
Yu et al.

(10) Patent No.: US 8,002,196 B2
(45) Date of Patent: Aug. 23, 2011

(54) RADIO FREQUENCY IC CARD DEVICE WITH VERY HIGH FREQUENCY

(75) Inventors: Yunbo Yu, Shenzhen (CN); Shan Zhu, Shenzhen (CN)

(73) Assignee: Nationz Technologies Inc., Shenzhen (CN)

( * ) Notice: Subject to any disclaimer, the term of this patent is extended or adjusted under 35 U.S.C. 154(b) by 0 days.

(21) Appl. No.: 12/771,675

(22) Filed: Apr. 30, 2010

(65) Prior Publication Data

US 2010/0227644 A1    Sep. 9, 2010

Related U.S. Application Data

(63) Continuation-in-part of application No. PCT/CN08/001452, filed on Aug. 12, 2008.

(30) Foreign Application Priority Data

Oct. 30, 2007   (CN) .......................... 2007 1 0124354

(51) Int. Cl.
 *G06K 19/06* (2006.01)
(52) U.S. Cl. ........................ 235/492; 235/487
(58) Field of Classification Search .................. 455/558; 235/492
 See application file for complete search history.

(56) References Cited

U.S. PATENT DOCUMENTS

| | | | |
|---|---|---|---|
| 5,995,006 A | 11/1999 | Walsh | |
| 6,585,166 B1 | 7/2003 | Ookawa et al. | |
| 6,717,801 B1 | 4/2004 | Castell et al. | |
| 6,870,733 B2 | 3/2005 | Castell et al. | |
| 6,883,718 B1 | 4/2005 | Le et al. | |
| 6,973,327 B2 * | 12/2005 | Seita | 455/550.1 |
| 7,221,159 B2 * | 5/2007 | Griffiths et al. | 324/318 |
| 7,228,155 B2 | 6/2007 | Saunders | |
| 7,296,754 B2 | 11/2007 | Nishizawa et al. | |
| 7,337,978 B2 | 3/2008 | Lee | |
| 7,345,638 B1 | 3/2008 | Tan et al. | |
| 7,395,975 B2 | 7/2008 | Ito | |
| 7,418,272 B2 | 8/2008 | Son | |

(Continued)

FOREIGN PATENT DOCUMENTS

CN    1687965 (A)    10/2005

(Continued)

OTHER PUBLICATIONS

"Contactless Payment and the Retail Point of Sale: Applications, Technologies and Transaction Models", A Smart Card Alliance Report, Mar. 2003, pp. 1-50, Retrieved from the internet on Mar. 24, 2010 at: http://www.it.iitb.ac.in/~tijo/seminar/Contactless_Pmt_Report.pdf.

(Continued)

*Primary Examiner* — Thien M. Le
*Assistant Examiner* — Christle I Marshall
(74) *Attorney, Agent, or Firm* — Stephen A. Bent; Foley & Lardner LLP

(57) ABSTRACT

A radio frequency (RF) IC card device with very high frequency comprises an IC device (102), a radio frequency interface device (103), an RF antenna (104), an IC card interface (106) and an RF interface (107). Particularly, said RF interface device (103) and the RF interface (107) operate in a frequency band of UHF (ultra high frequency) or SHF (super high frequency); said RF antenna (104) is directly integrated on an IC card (100); the RF IC card device with very high frequency exchanges data with other RF devices via the RF interface (107).

19 Claims, 3 Drawing Sheets

U.S. PATENT DOCUMENTS

| | | | |
|---|---|---|---|
| 7,460,076 | B2 | 12/2008 | Hayes et al. |
| 7,503,505 | B2 | 3/2009 | Koyama et al. |
| 7,679,514 | B2 * | 3/2010 | Rofougaran et al. ...... 340/572.2 |
| 7,686,654 | B2 | 3/2010 | Hubert et al. |
| 2005/0212690 | A1 * | 9/2005 | Nishikawa ................ 340/932.2 |
| 2005/0248926 | A1 | 11/2005 | Asom et al. |
| 2005/0280511 | A1 | 12/2005 | Yokoyama et al. |
| 2006/0224901 | A1 | 10/2006 | Lowe |
| 2007/0012785 | A1 | 1/2007 | Ohyama |
| 2007/0049338 | A1 | 3/2007 | He et al. |
| 2007/0213096 | A1 * | 9/2007 | Bella et al. ................... 455/558 |
| 2007/0243901 | A1 * | 10/2007 | Cho ............................. 455/558 |
| 2008/0076474 | A1 * | 3/2008 | Ho ................................ 455/558 |
| 2008/0320187 | A1 | 12/2008 | Kim et al. |
| 2009/0063340 | A1 | 3/2009 | Chiang |
| 2009/0102741 | A1 | 4/2009 | Li et al. |

FOREIGN PATENT DOCUMENTS

| | | |
|---|---|---|
| CN | 2733623 (Y) | 10/2005 |
| CN | 2762469 (Y) | 3/2006 |
| CN | 2912132 (Y) | 6/2007 |
| CN | 101009898 (A) | 8/2007 |
| CN | 200959362 (Y) | 10/2007 |
| CN | 101159029 (A) | 4/2008 |
| DE | 10 2004 057 763 A1 | 6/2006 |
| KR | 20060025212 A | 3/2006 |
| KR | 20060121556 A | 11/2006 |
| WO | WO 2005/051027 A2 | 6/2005 |
| WO | WO 2005/104584 A1 | 11/2005 |
| WO | WO 2005104584 A1 * | 11/2005 |
| WO | WO 2006/017424 A2 | 2/2006 |

OTHER PUBLICATIONS

International Search Report for PCT/CN2008/001452, issued Nov. 27, 2008. (2 pages).

Rakers et al., "Secure Contactless Smartcard ASIC with DPA Protection", IEEE 2000 Custom Integrated Circuits Conference, 2000, pp. 239-242. Retrieved from the Internet at: http://www.it.iitb.ac.in/~satish/phd/smartcard/ieee/00852657%20secure%20contactless%20smartcard%20ASIC%20with%20DPA%20protection.pdf.

Supplementary European Search Report EP 08 80 0492 dated Nov. 4, 2010.

U.S. Appl. No. 12/837,849 Non-Final Office Action dated Nov. 12, 2010.

* cited by examiner

RADIO FREQUENCY IC CARD DEVICE WITH VERY HIGH FREQUENCY

CROSS-REFERENCE TO RELATED PATENT APPLICATIONS

This application is a Continuation under 35 U.S.C. §111(a) of International PCT Application No. PCT/CN08/001452 filed Aug. 12, 2008, which claims priority to Chinese Patent Application No. 200710124354.7 filed Oct. 30, 2007, all incorporated herein by reference in their entirety.

TECHNICAL FIELD

The present invention relates to a record medium used along with a device in the field of electronic digital data process, particularly relating to a credit card or an identifying card that has a very high frequency transmission function for exchanging data. The existing invention more particularly relates to a radio frequency (RF) integrated circuit (IC) device that is configured to expand functions conveniently for supporting a mobile terminal and a fixed apparatus without modifying the existing terminal.

BACKGROUND

Mobile communication terminals such as cell phones have become necessary for everyday life, and new application demands for electronic wallets based on mobile terminals, cell phone passes for an access control terminal, public transit use of cell phone, cell phone VIP cards have become urgent. If the mobile communication terminals possess a mobile payment function, e.g., electronic wallet, or an expenditure application function, e.g., cell phone pass for an access control terminal, it would bring a great convenience for people's daily lives.

In order to meet these new demands, the key technical problem to be overcome is RF signal transmission and antenna arrangement. Prior technical solutions are all based on modification to mobile terminals, e.g. current near field communication (NFC) is conducted by adding an RF chip and an antenna in a mobile terminal. However, if an existing cell phone is not modified, functions such as the cell phone electronic wallet would not be achieved. Thus, these solutions have not much value in practice.

Chinese patent 200620133544.6 discloses a solution which provides a SIM card RF antenna device for a mobile communication terminal. The device includes an RF antenna, RF antenna fittings, and a flexible connection member. The antenna fittings are used for carrying the RF antenna and fixing the RF antenna at an outer side of the battery of a mobile communication terminal. The flexible connection member is used for connecting the RF antenna to a SIM card that is at the inner side of the battery of the mobile communication terminal. Thus, some users can use a mobile communication terminal to achieve non-telecommunication functions by only adding some cost and without changing the cell phone or having a customized cell phone back cover. The solution of the above patent needs modification to mobile communication terminals and needs to provide a customized antenna and a flexible connection member to every user. However, embedding an RF antenna and a flexible connection member into a mobile communication terminal is complicated in process and difficult in implementation, and high on cost. These problems will severely limit the adoption of this solution. In addition, this solution is significantly limited by the internal structure of the cell phone and thus has no versatility.

Another Chinese patent 200420121028.2 discloses a solution by adding an RF antenna to an existing cell phone terminal, adding an antenna area by modifying the cell phone, and adding an RF interface by modifying a SIM card. This solution still needs to modify a cell phone significantly, is complicated in process and costly; it has no commonality yet.

Another Chinese patent 200620026253.7 discloses a technical solution in which an RF antenna in a wireless RF payment cell phone is installed inside of a battery of the cell phone, arranged between the cell phone battery and a back cover of the cell phone, or attached to the outer surface of the back cover of the cell phone. The RF antenna is connected with a SIM card of the cell phone via contact points, connected with a smart IC card of the cell phone via contact points, or connected with a security chip in the cell phone via contact points. Same as the above, this solution is difficult to implement, costly, and has no versatility.

The technical solutions disclosed by the above patents all need to modify existing cell phones; currently, the number of existing cell phones is huge and there are 0.4 billion cell phones in China alone. There are a variety of cell phones and which are being upgraded frequently. Because these solutions have no versatility, are complicated for modification and are costly, they are difficult to be broadly adopted.

Based on this background, the present invention provides a simple, convenient, low cost method and device without the need of modification of a mobile terminal to realize wireless RF data exchange and to implement non-telecommunication functions such as cell phone wallet, cell phone pass for an access control terminal, etc., in order to solve a conflict between modification of the mobile terminal and realization of non-telecommunication functions.

SUMMARY OF THE INVENTION

The technical problem solved by the present invention is to avoid the disadvantages in prior art; the present invention provides a very high frequency RF IC card device that is configured to perform wireless RF data exchange and realizes functions including cell phone wallet, cell phone pass for an access control terminal, etc., without modifying the existing cell phone.

The present invention uses the following technical solution to solve the technical problems.

An RF IC card device with very high frequency is designed and used, which comprises an IC device, an RF interface device, an RF antenna, an IC card interface and an RF interface; particularly, said RF interface device and the RF interface operate in a frequency band of ultra high frequency (UHF) or super high frequency (SHF); said RF antenna is directly integrated on an IC card; the RF IC card device with very high frequency exchanges data with other RF devices via the RF interface.

The RF interface device and the RF interface of the RF IC card device with very high frequency operate at a frequency of 2.4 GHz.

The RF IC card device with very high frequency, whose RF antenna is directly integrated on the IC card, is an IC device that is integrated with a corresponding RF antenna and comprises a user identification module.

The RF IC card device with very high frequency, whose RF antenna is directly integrated on the IC card, is a MMC card, an SD memory card, or an SDIO memory card.

The RF IC card device with very high frequency, whose RF antenna is directly integrated on the IC card, is a non-IC-card device which is similar to an IC card in functions and uses IC card interface protocols, including ISO 7816, SDIO, SD and MMC and use a flexible or super thin circuit board with a corresponding RF antenna integrated thereon.

The RF IC card device with very high frequency is applied to a mobile device including a mobile terminal, particularly a cell phone, a personal digital assistant PDA, or a lap-top computer. The RF IC card device with very high frequency is configured to exchange data with the mobile device via the IC card interface.

The RF IC card device with very high frequency is applied to a fixed apparatus including a personal computer, an industrial control computer, an automatic teller machine (ATM), or an access control terminal; the RF IC card device with very high frequency is configured to exchange data with the fixed apparatus via the IC card interface.

Compared with the existing technologies, the RF IC card device with very high frequency according to the present invention avoids the drawbacks of the existing technologies and has the following advantageous effects:

1. Using the device of the present invention, an existing mobile terminal device can implement a function of near distance data exchange without modification or specifically adding a corresponding antenna so that the mobile terminal can be used as a cell phone wallet, a pass card for an access control terminal, a public transit card, a wireless identification card, etc.
2. The device of the present invention takes advantage of a characteristic that a very high frequency signal has a very short wavelength, eliminates the need to lead out an external antenna, so as to allow RF signals to be refracted out from gaps between inside of the terminal and components of the enclosure. It solves a problem that some lower frequency RF signals such as 13.56 MHZ frequency cannot be used in some mobile or fixed terminals because wireless signals are shielded.
3. The device of the present invention integrates the RF antenna into a substrate of flexible printed circuit board so that a prior IC device having a user identification module can have a function of RF communication added without replacement.

DETAILED DESCRIPTION OF THE PREFERRED EMBODIMENTS

The preferred embodiments will be described in detail with reference to the drawings.

Figure 1:
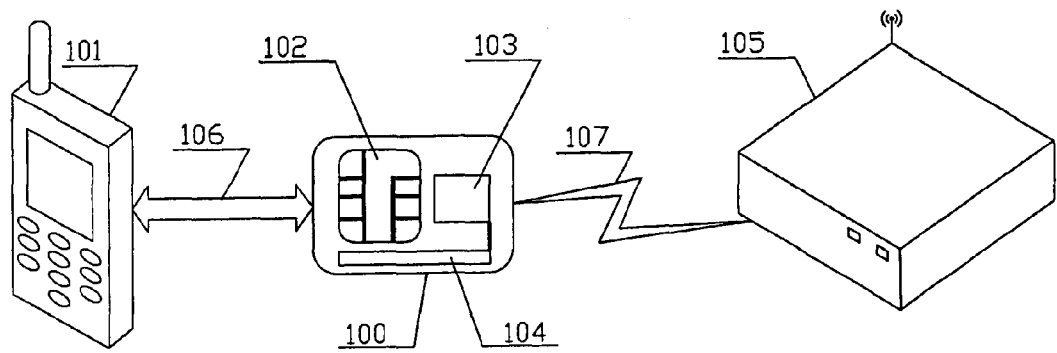
FIG. 1 is an application schematic view of an RF IC card device with very high frequency according to the present invention.

As shown in FIG. 1, a RF IC card device with very high frequency according to the present invention includes an IC device 102, an RF interface device 103, an RF antenna 104, an IC card interface 106, and an RF interface 107. Said RF interface device 103 and the RF interface 107 operate in a frequency band of UHF (ultra high frequency) or SHF (super high frequency); said RF antenna 104 is directly integrated on an IC card 100 and connected to a mobile terminal device 101 via the IC card interface 106 to implement an operation of user identifying or an operation of data exchange, and it communicates with a high frequency RF card reader 105 via the high frequency RF interface 107 to implement an operation of data exchange so as to allow the mobile terminal device 101 and the high frequency RF card reader 105 to complete a data exchange operation, and many wireless applications such as cell phone wallet, cell phone pass for an access control terminal and wireless ID certificate can be implemented without the need of modifying existing mobile terminals.

Figure 2:
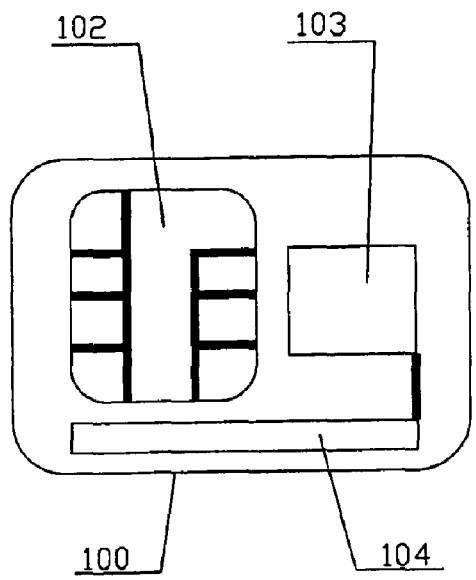
FIG. 2 is a schematic view according to a first embodiment of the device of the present invention.

FIG. 2 is a schematic view of a first embodiment of the present invention. The implementation is as follows: an IC device 102, an RF interface device 103, and an RF antenna 104 are packaged and fixed on the same substrate including an IC card, a circuit board or a flexible circuit board by soldering or other connection ways to form a very high frequency RF IC card 100.

Figure 3:
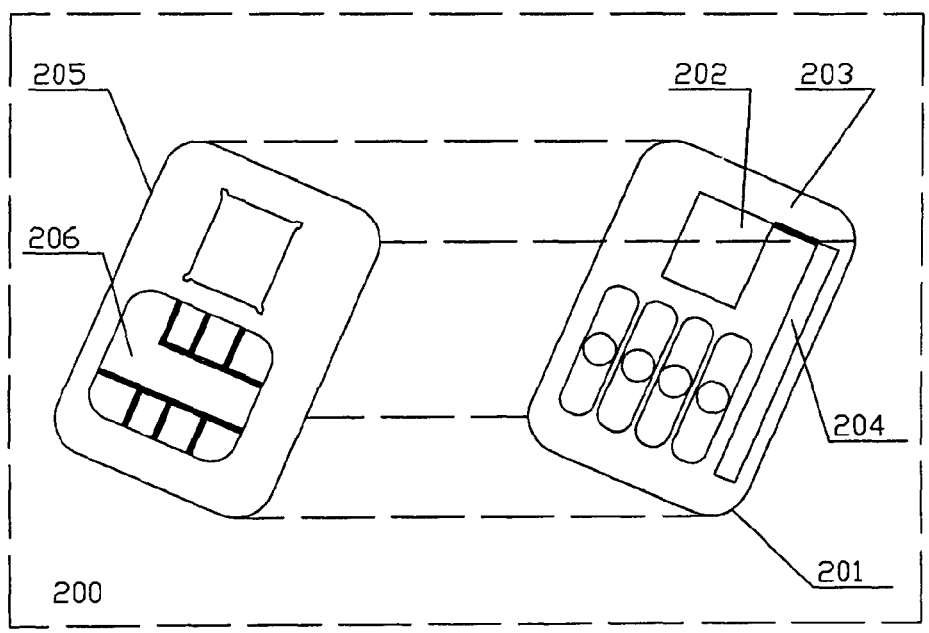
FIG. 3 is a schematic view according to a second embodiment of the device of the present invention.

FIG. 3 is a schematic view of a second embodiment of the present invention. The implementation is as follows: an auxiliary IC device 202 containing a very high frequency RF interface and an RF antenna 204 are fixed on a super thin substrate 203 to form a very high frequency RF IC device 201; and then an IC card 205 containing a main IC device 206 is combined with the IC device 201 to form a very high frequency RF IC card 200.

Figure 4:
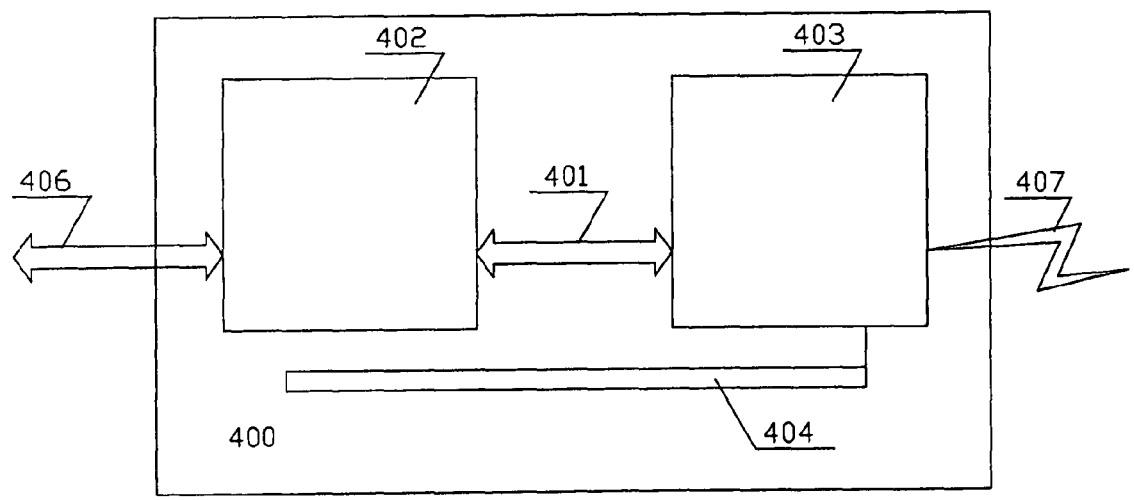
FIG. 4 is a principle block diagram according to one configuration of the device of the present invention.

FIG. 4 is a principle block diagram according to one configuration of the device of the present invention. A very high frequency RF IC card 400 includes an IC device 402, an RF interface device 403, and an antenna 404. The IC device 402 and the RF interface 403 are connected by means of an interface 401 between the sub-modules, and the IC device 402 and the RF interface device 403 may be a chip or an IC module respectively; all devices and antenna are fixed on the same substrate to form a very high frequency RF IC card 400. The very high frequency RF IC card 400 is connected to a mobile device or a fixed apparatus by an IC card interface 406, and communicates with an RF device via a very high frequency RF interface 407.

Figure 5:
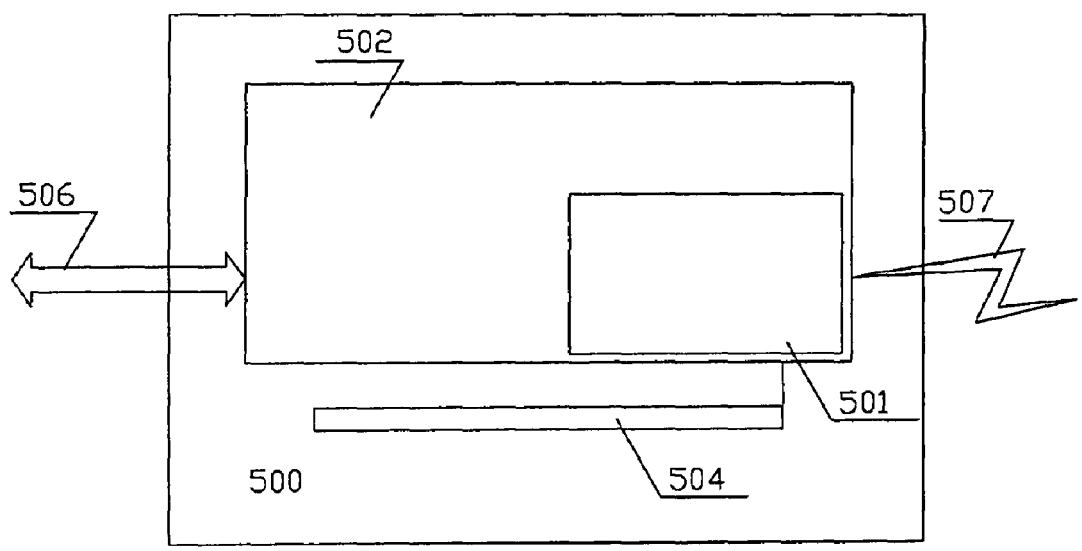
FIG. 5 is a principle block diagram according to another configuration of the device of the present invention.

FIG. 5 is a principle block diagram according to another configuration of the device of the present invention. The device includes an IC device 502 containing a very high frequency RF interface circuit 501, and also includes an antenna 504. The IC device 502 may be a chip or an IC module; all devices and antenna are fixed on the same substrate to form a very high frequency RF IC card 500. The very high frequency RF IC card 500 is connected to a mobile device or a fixed apparatus by an IC card interface 506, and communicates with an RF device via a very high frequency RF interface 507.

The RF IC card device with very high frequency according to the present invention has features of low cost, easy implementation, addition and expansion of wireless functions with respect to a prior terminal without modification to the existing terminal and having versatility.

What is claimed is:
1. An integrated circuit (IC) card device, comprising:
a radio frequency (RF) antenna integrated on the IC card device and configured for short-range communication using at least partially-shielded ultra high frequency (UHF) or super high frequency (SHF) signals;

an RF interface device integrated on the IC card and configured to exchange data with other RF devices through the RF antenna; and an interface device integrated on the IC card device and configured to exchange data directly with a terminal.

2. The IC card device of claim 1, wherein said terminal is selected from the group consisting of a cell phone, a PDA, and a computer.

3. The IC card device of claim 2, wherein said interface is configured to couple physically to said terminal.

4. The IC card device of claim 1, wherein said interface device is configured to connect directly to said terminal using an ISO 7816, SDIO, SD, or MMC standard.

5. The IC card device of claim 1, further comprising an IC device integrated on the IC card device and configured to uniquely identify the IC card device.

6. The IC card device of claim 5, wherein said IC device comprises a SIM.

7. The IC card device of claim 1, wherein the IC card device is configured to be physically coupled to said terminal without modification of said terminal.

8. The IC card device of claim 1, wherein the IC card device is configured to function in a slot inside said terminal, and wherein said short-range communication uses UHF or SHF RF signals transmitted from said IC card device in the slot and refracted out from gaps between components of said terminal.

9. A radio frequency (RF) device configured to attach to an integrated circuit (IC) card device, the RF device comprising:

an RF antenna integrated on the RF device; and an RF interface device integrated on the RF device and configured to exchange data with other RF devices using RF signals through the RF antenna, wherein said RF signals are at least partially-shielded ultra high frequency (UHF) or super high frequency (SHF) signals and wherein said RF device has a shape and size substantially similar to the IC card device but is substantially thinner than the IC card device such that the RF device is configured to attach to the IC card device on a lateral surface.

10. The RF device of claim 9, wherein the RF device is configured as a flexible membrane, and wherein said RF device, when attached to the IC card device on the lateral surface, does not substantially change the size and shape of the IC card device, such that the IC card device with the attached RF device still fits in a slot designed to receive the IC card device.

11. The RF device of claim 9, wherein the IC card device with the attached RF device is configured to fit into a slot for a SIM card of a mobile phone without modification to said mobile phone.

12. The RF device of claim 11, wherein said RF antenna is configured for a short-range communication.

13. The RF device of claim 12, wherein said short-range communication uses UHF or SHF RF signals transmitted from said IC card device disposed in the slot and refracted out from gaps of components of said mobile phone.

14. A SIM card for use in a cell phone, wherein said SIM card comprises a radio frequency (RF) antenna integrated therein, and wherein said RF antenna is configured for short-range RF communication by transmitting ultra high frequency (UHF) or super high frequency (SHF) RF signals that are at least partially shielded by the cell phone.

15. The SIM card of claim 14, wherein said RF antenna is configured to receive and transmit in the UHF or SHF range.

16. The SIM card of claim 14, wherein the SIM card is configured to fit into a SIM slot of said cell phone without modification to said cell phone.

17. The SIM card of claim 16, wherein said short-range communication uses UHF or SHF RF signals from said SIM card disposed in said SIM slot and refracted out from gaps between components of said cell phone.

18. An apparatus comprising:

a mobile terminal; and an integrated circuit (IC) card device disposed inside the mobile terminal, the IC card device comprising:

a radio frequency (RF) antenna integrated on the IC card device configured to transmit RF signals in an ultra high frequency (UHF) or super high frequency (SHF) range such that said UHF or SHF RF signals are transmitted from inside the mobile terminal and refracted out from gaps between components of said mobile terminal for a short-range communication;

an RF interface device integrated on the IC card and configured to exchange data with other RF devices through the RF antenna; and an interface device integrated on the IC card device and configured to exchange data directly with the mobile terminal;

wherein said IC card device is plugged into the mobile terminal without modification to said mobile terminal and configured to transmit said UHF or SHF signals that are at least partially shielded by said mobile terminal.

19. The apparatus of claim 18, wherein said mobile terminal comprises a mobile phone, and wherein said IC card device is a SIM card device plugged into a SIM slot inside said mobile phone.

* * * * *